May 19, 1931.  C. N. MITCHELL  1,805,836
SHOCK ABSORBER
Original Filed May 26, 1924   3 Sheets-Sheet 1
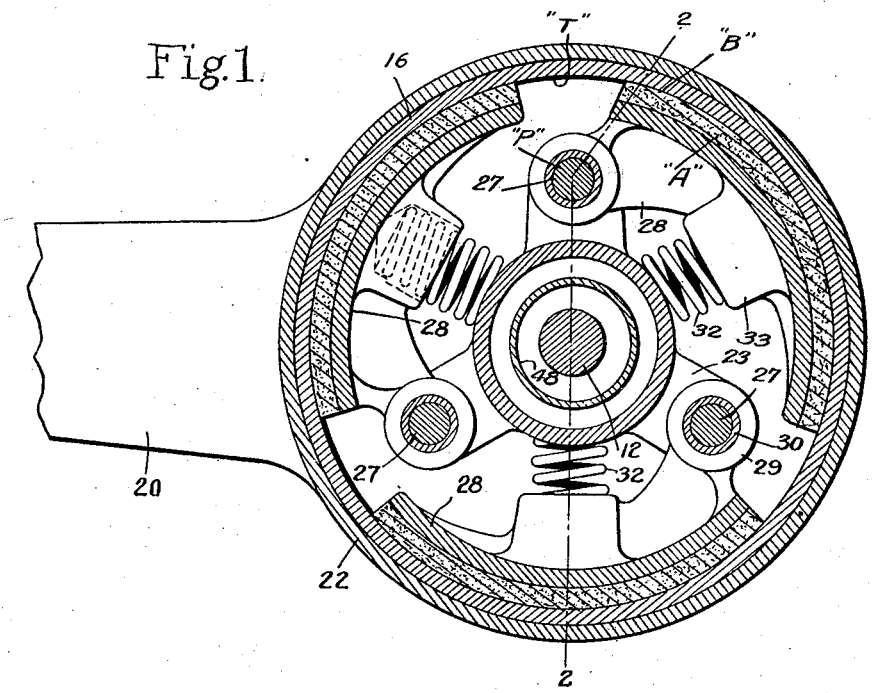
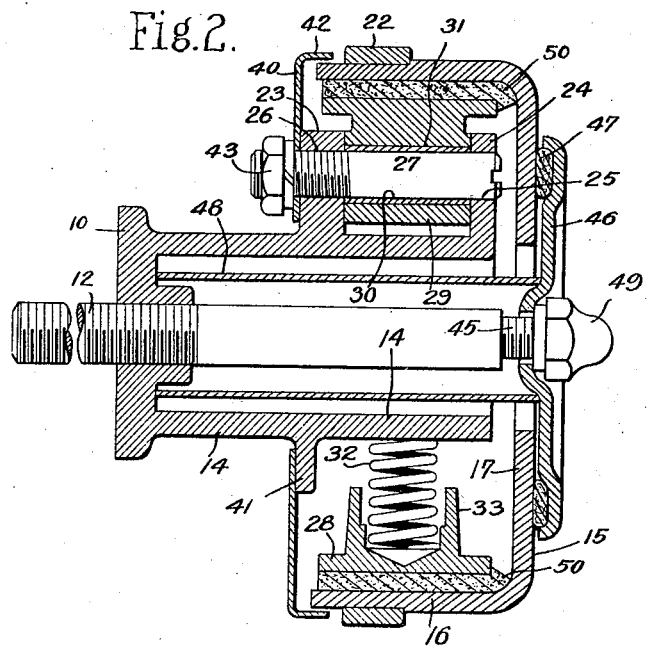
Inventor:
Courtney N. Mitchell.
By Ray, Oberlin & Ray
Attorneys.

May 19, 1931. C. N. MITCHELL 1,805,836
SHOCK ABSORBER
Original Filed May 26, 1924   3 Sheets-Sheet 2
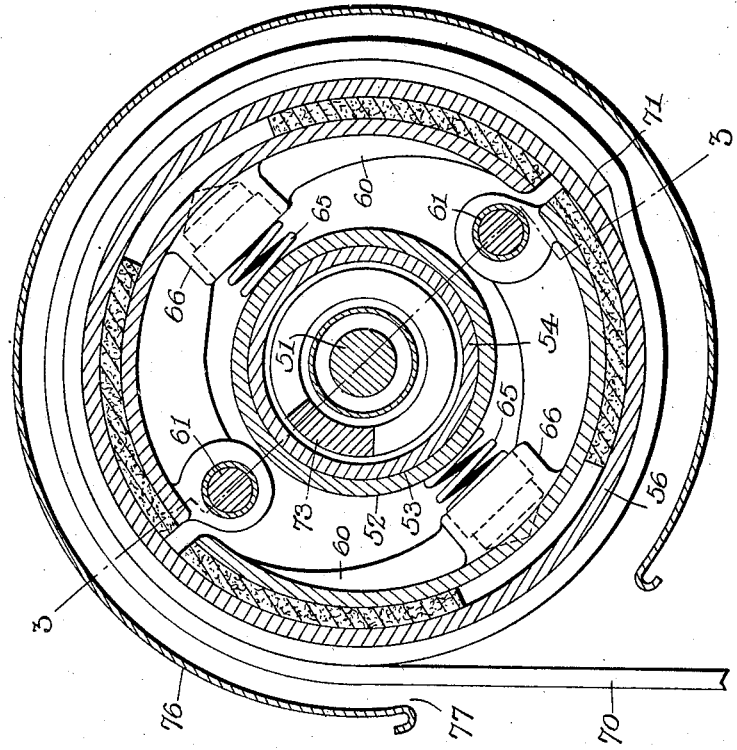
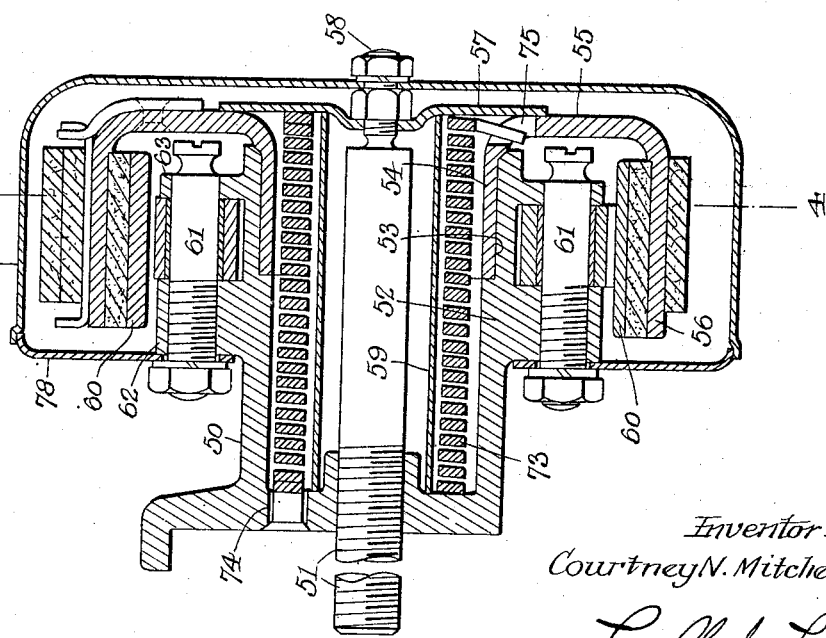
Inventor:
Courtney N. Mitchell
By Fay, Oberlin & Fay
Attorneys May 19, 1931.         C. N. MITCHELL         1,805,836
SHOCK ABSORBER
Original Filed May 26, 1924    3 Sheets-Sheet 3

Inventor.
Courtney N. Mitchell.

By Fay, Oberlin & Fay
Attorneys.

Patented May 19, 1931

1,805,836

UNITED STATES PATENT OFFICE

COURTNEY N. MITCHELL, OF CLEVELAND HEIGHTS, OHIO

SHOCK ABSORBER

Original application filed May 26, 1924, Serial No. 715,852. Divided and this application filed November 2, 1928. Serial No. 316,772.

This invention relates, as indicated, to shock absorbers, referring more particularly to that type of shock absorber which is adapted to be interposed between an automobile frame or chassis and the axle to brake the rebound of the frame, as when it moves upwardly away from the axle. In general practice the shock absorber and its enclosure is mounted on the frame of an automobile above the axle, and the braking mechanism thereof connected by a strap, or other suitable means, to the axle. The object of this invention is to provide in a shock absorber of the above described character an improved mechanism for braking or retarding such rebound, which mechanism is contained by, and operable upon, the interior of an enclosing casing or brake drum. The same permits the use of approximately the entire outer dimension of the shock absorber casing for the application of the braking means, thus providing a self-contained unit of minimum dimensions.

A further object is to provide a shock absorber which is adapted to operate to brake the shock of the movement of the axle toward the vehicle frame, as well as to retard movement of the axle in the opposite direction, it being of course desirable to have the braking action of the shock absorber of much lesser degree when the axle is moving upward than when the frame rebounds therefrom.

Another object of my invention is to provide an inexpensive, simplified type of connecting means which is adapted to connect the operating mechanism of the shock absorber to the axle of a vehicle. To the accomplishment of the foregoing and related ends, said invention, then, consists of the means hereinafter fully described and particularly pointed out in the claims.

This application constitutes a division of my co-pending application Serial No. 715,852, filed May 26, 1924, now Patent No. 1,699,707.

The annexed drawings and the following description set forth in detail certain mechanism embodying the invention, such disclosed means constituting, however, but one of various mechanical forms in which the principle of the invention may be used.

In said annexed drawings:—

Fig. 1 is a sectional view of my novel shock absorber;

Fig. 2 is a transverse axial sectional view of the absorber taken on line 2—2, in Fig. 1;

Figure 6:
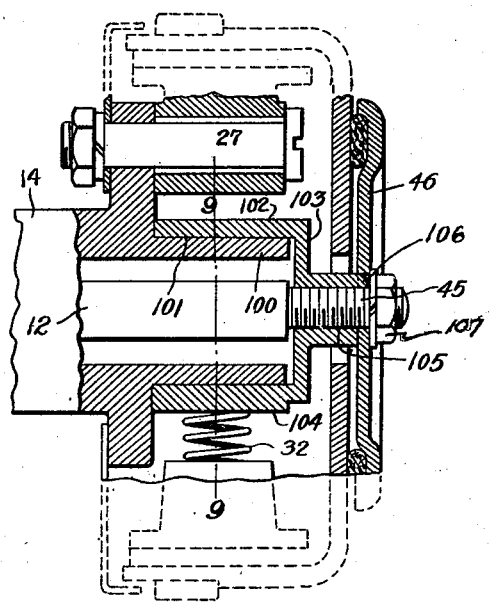
Figure 5:
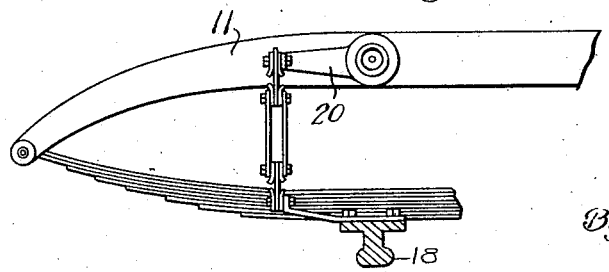

Figs. 3 and 4 are views similar to Figs. 1 and 2 of a modified type of the invention, said figures being taken on lines 3—3, in Fig. 4, and 4—4 in Fig. 3, respectively;

Fig. 5 is a fragmentary view of a vehicle frame and axle illustrating the manner of attachment of the present shock absorber shown in Figs. 1 and 2;

Fig. 6 is a view similar to Fig. 2 showing a modified construction.

Figure 7:
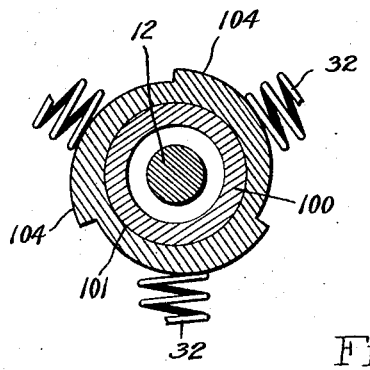
Figure 8:
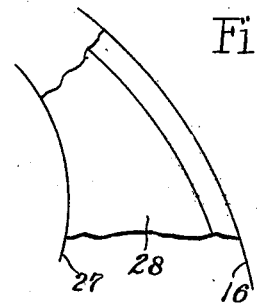

Fig. 7 is a sectional view taken on the line 7—7 in Fig. 8; and

Fig. 8 is a diagrammatic view illustrating the convergence between the brake drum and shoe pivotal bearing of this invention.

Referring now to the embodiment of my invention illustrated in Figs. 1, 2 and 6, 10 designates a flanged hub member which is adapted to be attached to the side of a vehicle frame or chassis 11 by any suitable means, such as a bolt 12. The bolt 12 herein is screw threaded in the hub 10 and has its forward end projecting through a hollow boss portion 14, integrally formed on the front side of member 10. Enclosing the outer end of boss 14 is a flanged brake drum 15, which is rotatably held by suitable means, to be presently described so as to be circumferentially movable with respect to the axis of the hub boss 14 and the bolt 12. The drum consists of an annular flange or brake band 16, against the inner surface of which the shock absorbing or braking mechanism of this invention frictionally engages, and of a vertical front side 17.

As is usual in the present type of shock absorbers, the braking action of the various mechanisms result from the rotation of the drum band 16 in one direction. During the reverse movement of such band the brake means are automatically rendered inoperative. Many designs of connections may be utilized for connecting the drum 15 to the axle 18 of an automobile, so that when in use, as the axle is moved toward and away from the vehicle chassis, the drum is caused to oscillate. As seen in Figs. 1, 2 and 6, the drum 15 is provided with a radial arm 20, to the outer end of which suitable connection is made to the axle 18. Such arm may be formed integral with the drum, or, as shown, with an annular ring portion 22 adapted to be secured around the outer surface of the drum band 16.

As has been heretofore stated the braking mechanism embodied in this invention is carried internally of the drum and is adapted to engage the inner periphery of band 16. Such mechanism consists essentially of a plurality of segmental brake shoes, each having a strip of frictional brake material 19 on their outer surfaces. Means for mounting the shoes consists of equidistantly spaced pairs of radially projecting lugs 23 and 24. As best seen in Fig. 2, each pair of these lugs is provided with aligned apertures 25, one or both of which may be screw threaded as at 26 for the reception of pivotal pins 27. The brake shoes indicated by numerals 28 are formed at one end with inwardly extending bosses 29 adapted to be received between the pairs of lugs 23 and 24, and such bosses have transverse apertures 30, through which is passed the pins 27. Suitable bearings 31 may be used between the pins 26 and the apertures 30. Springs 32, seated in sockets 33, provided on the inner side of the shoes and having their outer ends bearing against the hollow boss 14, are employed to maintain the brake shoes pressed into frictional engagement at all times with the drum band 16.

One of the main objects of the present invention is to provide a simply constructed shock absorber having an external rotatable brake drum and a plurality of brake shoes co-operating therewith to retard the movement of such drum in one direction. The herein described novel mechanism accomplishes this function in a very much more effective and improved manner over the mechanisms of previously designed shock absorbers. Taking for example, the arrangement of one of the shoes (in Fig. 1), together with its point of pivotal mounting and the relative position of the brake band, it will be seen that the brake band is concentrically movable about its axis and about the outer periphery of the friction surface of the brake shoes when the latter are in normal or inoperative position. It will also be seen that the pivotal points of the shoes and the outer peripheries thereof are of eccentric relation. To aid in the understanding of the braking operation of the present shoes certain characters are placed on Fig. 1. "T" designates the point of tangent of the path of travel of the brake band 16 relative to the pivotal point P of shoe A, and B any point on the outer periphery of said shoe to the right of the point T. Consequently, if the point B be moved to the left the friction surface at that point of the shoe, due to the eccentric relation of the point P, will become wedged against the inner surface of the brake band 16 and cause a braking action of the movement of the brake drum. Likewise, the entire outer surface of the brake shoe, on account of its construction, will be forced into tight engagement with the brake drum during its rotation to the left.

In the reverse movement (to the right of the drawings), it will be obvious that such wedging or braking action of the shoes will be relieved, and only the pressure of springs 32 will be effective at that time. Inasmuch as it is found desirable to retard to a lesser degree the sudden movement of an axle toward the chassis of a vehicle the springs 32 may be designed to force the brake shoes into tight enough engagement with the drum band 16 to sufficiently brake such movement.

Further details in the construction of the embodiment of the invention shown in Figs. 1 and 2 consist of a dust plate 40 screwed to the rear face of bosses 23 and a flange 41 circumferentially provided on member 14 in alignment with such bosses. For simplicity of construction the pins 27 extend through such plate and a lock nut 43 and washer are secured on the outer end thereof. Plate 40 has an inturned annular flange member 42 which is adapted to overlie the outer surface of the brake drum band 16, and thus prevent any dirt from entering the interior of the drum at that point. Mounted on the outer end 45 of bolt 12 is a disk washer 46 adapted to prevent the drum 15 from moving laterally, there being interposed a ring of packing material 47 between the disk and the side 17 of the drum. Contained in the hollow portion of the boss 14, and surrounding the bolt 12, is a spacing tube 48, against the end of which the disk 46 is held by nut 49. As seen in Fig. 2, the front edges 50 of the frictional brake material 19 are extended slightly beyond the edge of the brake shoes, and these edges 50 curve inwardly for the purpose of engaging the inner side of plate 17.

It will be seen from the foregoing that the brake drum is held in assembled position only by the brake shoes, and by the rounded ends 50 of the friction unit, and the disk washer 46, which construction is very simple and permits the self-aligning of the brake drum without difficulty.

I have shown in Figs. 6 and 7 a modification of the embodiment described above by which adjustment may be given to the pressure of springs 32 to compensate for the wear of the friction material on the brake shoes. In such modification, the forward end 100 of the hub member 14 is provided on its exterior with a cylindrical bearing surface 101 upon which is rotatably mounted an annular sleeve 102 of an adjusting member 103. The outer surface of sleeve 102 is provided with a series of equidistantly spaced cam lugs 104 against which the inner ends of springs 32 bear, it being obvious that the tension or pressure of the springs may be increased by merely rotating the member 103 to present a higher portion of the cams in engagement with such springs. The outer end of member 103 is reduced in size and has a hole 105 therein through which is passed the end 45 of the bolt 12.

To facilitate the adjustment of member 103 from the exterior of the shock absorber, the outer reduced end of said member is non-rotatably secured to the disk washer 46 as by a suitable spline 106. It will be seen therefore that by turning the washer 46, the adjustment of cams 104 is changed. To lock the parts in adjustment, a nut 107 is secured on bolt 45 outside the washer, thus serving to firmly hold the sleeve 102 on the hub from rotation. It will further be seen that by the use of the construction described above, the spacer tube 48 may be eliminated, in which case the adjustable member 103 serves to limit the lateral movement of the washer 46.

The modified form of shock absorber illustrated in Figs. 3 and 4 embodies the use of practically the same construction of braking mechanism as in the previously described shock absorber of the invention, comprising a similar hub attaching member 50 adapted to be mounted on the side of a vehicle chassis by means of bolt 51 anchored therein. Member 50 is formed with an outwardly projecting hollow boss 52 which is provided at its outer end with an interior cylindrical bearing surface 53, in which is rotatably seated an inwardly projecting annular hub or journal 54 formed upon a drum 55.

The drum 55 is also provided with an inturned flange portion 56 at its outer rim, which flange serves as a brake band similar to the band 16, as will presently appear. Means for retaining the drum in place on the bearing 53 is shown in the form of a disk 57 mounted on the forward projecting end 58 of bolt 51. There may be also utilized a spacer tube 59 interiorly fitted within the hollow boss 52 to prevent disk 57 from bearing too tightly against the drum.

The braking mechanism is here also carried internally of the drum, such mechanism comprising two or more brake shoes 60 pivotally mounted at one end upon pins 61, which are secured in pairs of lugs 62 and 63, projecting radially from boss 52. Each brake shoe is arcuate in form, with its outer surface concentric to the band portion 56 of the drum 55, and has pads or layers 64 of friction brake material attached to said outer surface. It is found that in forming the shoe as shown in Fig. 4 with its ends terminating substantially diametrically of the brake drum, the greatest amount of friction or wedging action occurs at the ends of the shoe as it is moved into engagement with the drum. Therefore, in some cases, it is advantageous to provide the friction material only at the ends of the shoe, otherwise the central portion thereof would tend to hold the ends away from the desired wedging action. Springs 65, received in the sockets 66 provided in the inner sides of the shoes 60 and engaging the boss 52, tend to keep the brake shoes pressed outwardly into engagement with the inner periphery of the drum. These brake shoes co-operate with the brake drum upon rotation of the drum to the left to retard such rotary movement, as has been hereinbefore described with relation to the shock absorber of Figs. 1 and 2, but in this embodiment the shoes are not adapted to exert any braking action upon the drum in its reverse movement.

Means for connecting the brake drum 55 to the axle of a vehicle is shown in the form of the usual strap 70, which is wrapped around the exterior of the brake band 56 and has its end attached to said drum as at 71. The other end of the strap is attached in any well known manner, not shown, to the axle of the vehicle, it being readily understood that upon the separation of the vehicle chassis and axle the strap will rotate the drum 55 to the left, and consequently the braking mechanism will operate to retard such separation.

It is necessary to provide means for taking up slack in the strap which results when the axle is moved towards the chassis. For this purpose I provide a helical spring 73, coiled around the tubular spacer 59, and having its ends engaged in suitable slots 74 and 75 formed in the attaching member 50 and in the brake drum 55 respectively. Spring 73 tends to rotate the drum 55 to the right against the pull of the strap.

A cover plate 76 is mounted outside the brake drum 55 on the end of the bolt 51 to enclose the strap and other operating mechanisms of the present shock absorber, there being provided in one side of said cover a suitable opening 77 for the end of the strap leading to the axle. In addition, a second plate 78 is secured to the rear face of boss lugs 62, which, with plate 76, completely encloses the braking mechanism.

Fig. 8 illustrates on a greatly enlarged scale, the convergence between the inner surface of the brake drum and the outer adjacent surface of the brake shoe pivotal bearing. As has been previously described, as the drum is moved to the left (of the drawings), the brake shoe, on account of its frictional engagement therewith, will be moved to wedge between these two convergent surfaces, which effects a braking action on the rotary movement of the drum.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A rebound check for spring vehicles comprising in combination with a drum mounted rotatably on one of the two vehicle members between which the vehicle springs react, a spring connected to the drum for being tensioned by the rotation of the drum in one direction and for rotating the drum in the opposite direction by its reaction; means connecting the drum with the other vehicle member for rotating the drum in the direction for tensioning the spring by the separating movement of the two vehicle members; a brake shoe fitting and spring-pressed against a circumaxial surface of the drum and means for varying at will the tension of the spring pressure on the shoe.

2. In the construction defined in claim 1 foregoing, the drum having a circumaxial flange and the brake shoe being mounted for friction bearing on the inner surface of said flange.

3. In the construction defined in claim 1 foregoing, the drum having a circumferential flange and the brake shoe being mounted for friction bearing on the inner surface of said flange, a stud axle on which the drum is rotatably mounted, the means for mounting the brake shoe being a transaxial member non-rotatably engaged with the stud axle.

4. In the combination defined in claim 1 foregoing, a stud axle on which the drum is rotatably mounted, the drum having a cavity at one side, the brake shoe being mounted in said cavity, and a transaxial member non-rotatably engaged with the stud axle on which the shoe is mounted.

5. In the construction defined in claim 1, a stud axle on which the drum is rotatably mounted, the drum having a cavity at one side, the brake shoe being mounted in said cavity and a transaxial member non-rotatably engaged with the stud axle on which non-rotatable member the brake shoe is mounted, and a spring carried by the stud axle reacting on the shoe for pressing it outwardly with respect to the axle for its friction bearing against the inner peripheral wall of the said cavity.

6. In the construction defined in claim 1 foregoing, a stud axle on which the drum is rotatably mounted, the drum having a cavity at one side, the brake also being mounted in said cavity, and a transaxial member non-rotatably engaged with the stud axle on which member the shoe is mounted, a spring carried by the stud axle reacting on the shoe for pressing it outwardly with respect to the axle for its friction bearing against the inner peripheral wall of said cavity and means for varying the tensional action of the spring on the shoe.

7. A rebound check for spring vehicles comprising in combination with a drum mounted rotatably on one of the two vehicle members between which the vehicle springs react, a spring connected to the drum for being tensioned by the rotation of the drum in one direction and for rotating the drum in the opposite direction by its reaction; means connecting the drum with the other vehicle member for rotating the drum in the direction for tensioning the spring by the separating movement of the vehicle members; a stud axle on which the drum is mounted for rotation; a pair of brake shoes each carried non-rotatably by the stud axle movable radially with respect thereto in opposite directions, means for pressing the shoes oppositely against the circumaxial surface of the drum; and means for varying said pressure at will.

8. A rebound check for spring vehicles comprising in combination with a drum mounted rotatably on one of the two vehicle members between which the vehicle springs react; a spring connected to the drum for being tensioned by the rotation of the drum in one direction and for rotating the drum in the opposite direction by its reaction; means connecting the drum with the other vehicle member for rotating the drum in the direction for tensioning the spring by the separating movements of the vehicle members; a stud axle on which the drum is mounted for rotation; a pair of brake shoes pivotally carried by the stud axle for swinging about their pivots oppositely against the circumaxial surface of the drum, and means for pressing them thereagainst, the pivots of the two shoes being relatively remote in opposite direction from the axis of the stud axle and drum, both shoes trending from their pivots in the same circumferential direction, whereby the rotation of the drum in one direction causes both shoes to hug the circumaxial surface of the drum for increasing friction and its rotation in the opposite direction causes both shoes to be relaxed as to their pressure on the drum for diminishing friction.

Signed by me this 29th day of October, 1928.

COURTNEY N. MITCHELL.